A. B. DOBBS.
AUTOMOBILE JACK.
APPLICATION FILED JUNE 12, 1919.
1,320,538.
Patented Nov. 4, 1919.
2 SHEETS—SHEET 1.
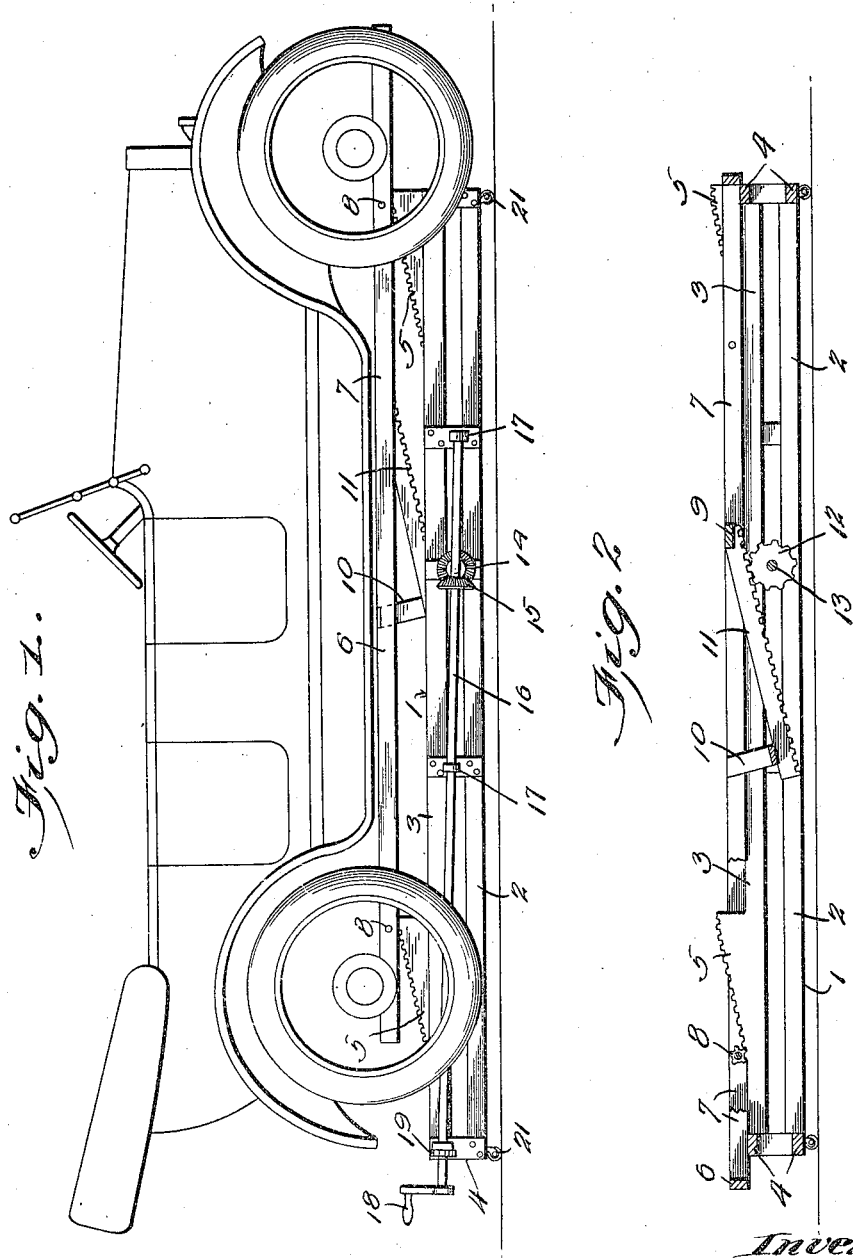

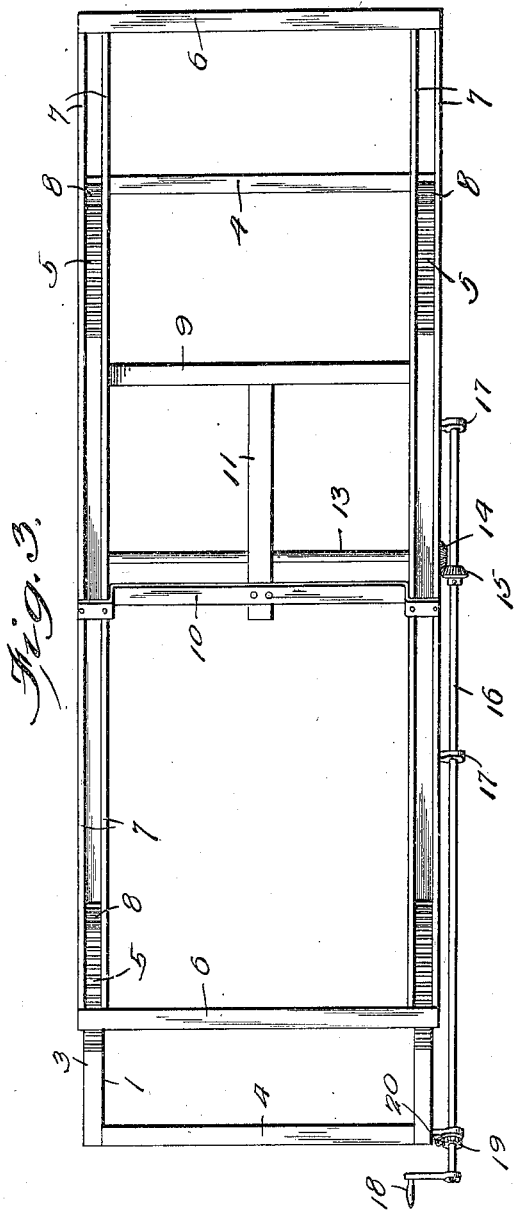
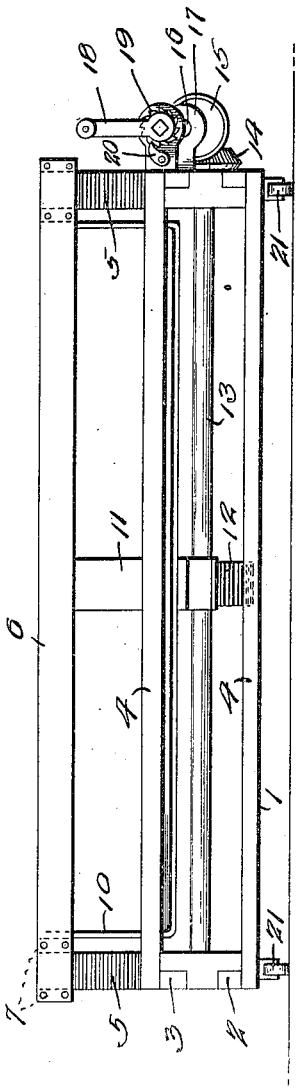

UNITED STATES PATENT OFFICE.

ANDREW B. DOBBS, OF HERRICK, ILLINOIS.

AUTOMOBILE-JACK.

1,320,538.	Specification of Letters Patent.	Patented Nov. 4, 1919.

Application filed June 12, 1919. Serial No. 303,658.

*To all whom it may concern:*

Be it known that I, ANDREW B. DOBBS, a citizen of the United States, residing at Herrick, in the county of Shelby and State of Illinois, have invented a new and useful Automobile-Jack, of which the following is a specification.

The object of my invention is to provide an automobile jack of improved construction, which can be conveniently operated to raise the entire body of the automobile from the floor.

In the accompanying drawings illustrating my invention—

Figure 1 is a side elevation of my automobile jack with the jack members in their extreme elevated position raising a car from the floor;

Fig. 2 is a longitudinal section showing the jack in lowered position;

Fig. 3 is a top plan; and

Fig. 4 is a rear end view of the device.

Like numerals designate like parts in the several views.

Referring to the accompanying drawings I provide a lower frame 1 mounted on heavy rollers 21 and consisting of spaced longitudinal members 2 and 3, as shown in Fig. 4, and spaced end members 4. I further provide an upper frame, consisting of end bars 6, which are attached to the spaced longitudinal bars 7 as shown in Fig. 3. Mounted on or integral with the longitudinal member 3 I provide a rack 5 at both ends of the frame, said rack meshing with suitable pinions 8. The latter members are mounted between the spaced longitudinal bars 7, as shown in Figs. 2 and 3. I further provide an intermediate cross bar 9, as shown in Figs. 2 and 3, and a cross bar 10 rearward of the bar 9 and in a lower position, and an inclined rack 11 attached to bars 9 and 10 as shown in Fig. 2. I further provide a transverse shaft 13, on which is mounted a gear 12 which meshes with the inclined rack 11 as shown in Fig. 2. Mounted on the end of shaft 13 I provide a suitable gear 14 meshing with a suitable gear 15, the latter gear being mounted on a longitudinally extending shaft 16 which is supported in suitable bars 17 attached to the frame as shown in Fig. 1. At the rear end of shaft 16 I provide a suitable crank 18 (or any suitable manual or power operating means) by which shaft 16 may be rotated. As shown in Fig. 3 I provide a suitable ratchet 19 on shaft 16, and a pawl 20 mounted on the frame and adapted to engage ratchet 19 and prevent the shaft 16 from turning in a reverse direction except when the pawl is intentionally released by the operator from its engagement from the ratchet 19.

The operation of the invention will be apparent by reference to the accompanying drawings. Crank 18 operates shaft 16 and gear 15 which in turn meshes with and drives gear 14, shaft 13 and gear 12. As gear 12 rotates the inclined rack 11 rides up on it and thereby raises the entire upper jack frame and thus raises the entire body of the automobile. The jack may be readily moved about to any desired part of the garage by reason of provision rollers 21. Pinions 8 ride on racks 5 and substantially increase the effectiveness of the jack.

What I claim is:

1. In an automobile jack, the combination of a lower frame, a plurality of inclined racks, an upper frame having space longitudinal bars, pinions mounted in said bars and attached to mesh with the inclined racks, space cross bars attached to the upper frame, an inclined rack attached to the cross bars, a transverse shaft mounted in the lower frame and having a gear meshing with the last mentioned inclined rack, a shaft mounted on the lower frame and extending longitudinally thereof in an upwardly inclined position, a gear carried by said shaft and meshing with the gear on the transverse shaft, bars for the aforesaid longitudinally extending shaft, a ratchet carried by the shaft, a pawl releasably engaging said ratchet and means for rotating said shaft.

2. In an automobile jack, the combination of a lower frame, a plurality of inclined racks, an upper frame having space longitudinal bars, pinions mounted in said bars and attached to mesh with the inclined racks, space cross bars attached to the upper frame, an inclined rack attached to the cross bars, a transverse shaft mounted in the lower frame and having a gear meshing with the last mentioned inclined rack, a shaft mounted on the lower frame and extending longitudinally thereof in an upwardly inclined position, a gear carried by said shaft and meshing with the gear on the transverse shaft, bars for the aforesaid longitudinally extending shaft, means for preventing accidental reverse rotation of the inclined longitudinal shaft, and a crank mounted on the end of said shaft for manually rotating same.

3. In an automobile jack adapted to raise the entire body of an automobile, the combination of a lower frame, an upper frame movably mounted relative to the lower frame, and extending under substantially the entire body of the car, inclined racks at both ends of the lower frame, pinions mounted on the upper frame and meshing with said inclined racks, a centrally disposing transverse shaft mounted on the lower frame, a gear mounted on same shaft, and inclined racks attached to the upper frame and meshing with said gear, an upwardly inclined shaft extending longitudinally of the lower frame, means operatively connecting said shaft with the centrally positioned transverse shaft, means for operating said longitudinal shaft, and means for locking it in a desired position, substantially as and for the purposes set forth.

ANDREW B. DOBBS.

Copies of this patent may be obtained for five cents each, by addressing the "Commissioner of Patents, Washington, D. C."